US010826854B1

(12) United States Patent
Ledet (10) Patent No.: US 10,826,854 B1
(45) Date of Patent: Nov. 3, 2020

(54) MESSAGE GUARDIAN (71) Applicant: Open Invention Network LLC, Durham, NC (US)

(72) Inventor: David Gerard Ledet, Allen, TX (US)

(73) Assignee: Open Invention Network LLC, Durham, NC (US)

(*) Notice: Subject to any disclaimer, the term of this patent is extended or adjusted under 35 U.S.C. 154(b) by 523 days.

(21) Appl. No.: 14/705,231

(22) Filed: May 6, 2015

Related U.S. Application Data (60) Provisional application No. 62/114,152, filed on Feb. 10, 2015.

(51) Int. Cl.
*H04L 12/58* (2006.01)
*G06F 40/166* (2020.01)
*G06F 40/226* (2020.01)

(52) U.S. Cl.
CPC .......... *H04L 51/12* (2013.01); *G06F 40/166* (2020.01); *G06F 40/226* (2020.01)

(58) Field of Classification Search
None
See application file for complete search history.

(56) References Cited

U.S. PATENT DOCUMENTS

| 8,645,825 | B1* | 2/2014 | Cornea | G06F 40/232 715/257 |
| 9,244,905 | B2* | 1/2016 | Joshi | G06F 3/0237 |
| 9,318,108 | B2* | 4/2016 | Gruber | G06F 9/54 |
| 9,386,152 | B2* | 7/2016 | Riahi | H04M 5/00 |
| 2006/0095524 | A1* | 5/2006 | Kay | G06Q 10/107 709/206 |
| 2011/0055334 | A1* | 3/2011 | Tivyan | H04L 51/30 709/206 |
| 2012/0135705 | A1* | 5/2012 | Thaker | H04W 4/029 455/405 |
| 2012/0198002 | A1* | 8/2012 | Goulart | H04L 51/36 709/206 |
| 2013/0283401 | A1* | 10/2013 | Pabla | G06F 21/60 726/30 |
| 2017/0180276 | A1* | 6/2017 | Gershony | H04L 51/18 |

* cited by examiner

Primary Examiner — Marcus T Riley (57) ABSTRACT

An apparatus, process, and computer program to prevent inappropriate messages originated from a client device is provided. A validation message that includes a message composed by a user may be received from a client device. A determination is made as to whether the composed message comprises data that matches with one or more inappropriate terms, phrases, and/or objects. A notification is sent to the client device when the composed message comprises data that matches with one or more inappropriate terms, phrases, and/or objects.

21 Claims, 11 Drawing Sheets

The following message:

*The Alpha Product is going to smash the tech market next year.*

Failed validation.

*"Alpha Product"* has been determined to possibly be damaging outside the organization.

Recommended text:

*The future Product is going to smash the tech market next year.*

MESSAGE GUARDIAN

CROSS REFERENCE TO RELATED APPLICATION

This application claims the benefit of U.S. Provisional Patent Application Ser. No. 62/114,152, which was filed Feb. 10, 2015. The subject matter of this earlier-filed application is hereby incorporated by reference in its entirety.

FIELD

The present invention generally pertains to message guard system, and in particular, a system that prevent unsuitable communications from being transmitted to another device.

BACKGROUND

The Internet allows for easy communication through, for example, email, text message, phone call, group chat, etc. While convenience is allowed through this communication, another aspect is the trail that is left that stands the test of time. Messages are stored for many different reasons, but the fact remains that when something is communicated on-line, there usually is a historical aspect of the communication that remains accessible long after the communication has occurred.

In today's modern era, people are able to easily communicate with other users at almost any time. While this adds greatly to the convenience aspect, their guard may be down when messages are sent, or words spoken. In the past, being accountable for past communication was usually not an issue.

However, the problem arises when the types and methods of communication are widely available, allowing almost anyone to communicate at almost any time. There may be times when the user forgets the trail of communication that exists for the communication.

The trail of information is stored in servers, usually in the network or the cloud automatically. Companies house large data centers that allow the recording of most, if not all communication of its users. These servers are subject to hacker attacks regardless of the security measures in place.

Once the trail of communication is made public, the damage can be devastating to those that are victims. Suddenly, those who wish to harm people can take records of communication spoken or typed out of context.

There are solutions available for this issue. However, there is no single perfect solution. Security surrounding data servers can be increased, making it more difficult for unwanted intrusion. While this solution may solve the problem in the short-term, it has been widely proven that hackers can break into almost any server in time.

Other solutions involve marketing to remind users to be careful with communication and always be aware that words spoken or typed may be kept accessible long after the user may desire.

Thus, it may be beneficial to stop the problem before it is initiated.

SUMMARY

Certain embodiments of the present invention may be implemented and provide solutions to the problems and needs in the art that have not yet been fully solved by the conventional approaches discussed above. For example, either shortly after, or before, sending a composed message or spoken message, the system may seek to process the data and bring to light any issue encountered to help the user to be careful with the data that is to be transmitted. This solution may require protocol-rich data communication as well as devices with high processing abilities. The current technical environment is precisely situated to perform at a level that will allow this type of application to be executed efficiently.

In one embodiment, a process includes at least one of receiving, by a system, a message composed by a user of a client device. The process further includes determining, by the system, whether the composed message comprises inappropriate terms, phrases, and/or objects. The process also includes transmitting a notification when the composed message comprises inappropriate terms, phrases, and/or objects.

In another embodiment, an apparatus includes a processor and memory. The memory includes a set of instructions. The set of instructions, with the processor, is configured to cause the apparatus to perform at least one of receive, from a client device, a validation message comprising a message composed by a user of the client device, determine whether the composed message comprises data that matches with one or more inappropriate terms, phrases, and/or objects, and send a notification to the client device when the composed message comprises data that matches with one or more inappropriate terms, phrases, and/or objects.

In yet another embodiment, a computer program may be embodied on a non-transitory computer-readable medium. The computer program may cause the processor to receive, from a client device, a validation message comprising a message composed by a user of the client device, determine whether the composed message comprises data that matches with one or more inappropriate terms, phrases, and/or objects, and send a notification to the client device when the composed message comprises data that matches with one or more inappropriate terms, phrases, and/or objects.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments of the present invention generally pertains to processing a message originating from a user, and more specifically, processing a message before delivery of the message to determine whether the message includes offensive information that may be harmful to the user at a later time. In certain embodiments, an alternative communication may be available to the user when notified of the potentially offensive information contained in the message. This may include the ability to place a direct call to the recipient(s) of the message.

Figure 1A:
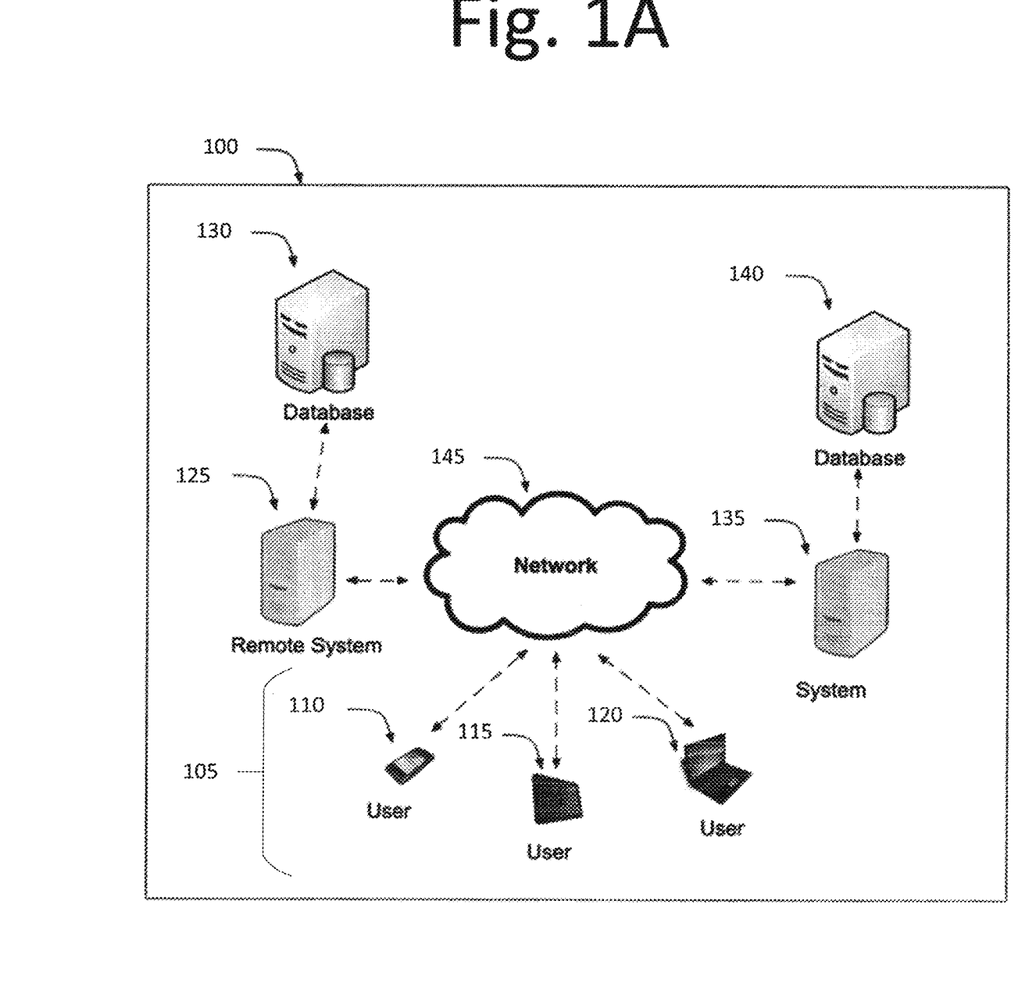
FIG. 1A illustrates a message guardian system, according to an embodiment of the present invention.

FIG. 1A illustrates a message guardian system 100, according to an embodiment of the present invention. In one embodiment, a user may use a client device 105, such as a mobile device 110, a tablet 115, and a laptop or desktop computer 120, to download software application(s), such as a message guardian application, from system (or server) 135. In some embodiments, the user may utilize a gaming system, a DVD player, or any other device that is normally utilized to consume media. Client device 105 may be connected to network 145, which may be the Internet or any other type of network. It should be appreciated that other types of devices may be used in other embodiments. For example, a PDA, an MP3 player or any other wireless device, such as a gaming device that can also transmit and receive information, may also be used.

The user may also interface with a mobile device 110, tablet 115, or laptop/desktop 120 and connect to system 135 via network 145. System 135 may be redundant, or may be more than a single entity. Database 140 may be directly connected to system 135 or connected remotely through the network 145.

A remote system 125 may communicate with network 145. Remote system 125 may be redundant, or be more than a single entity without deviating from the scope of the invention. A database 130 may be directly connected to the remote system 125 or connected remotely through the network 145 in some embodiments.

The database 130 may reside in system 125, or database 130 may be either directly connected to the remote system 130 or remotely through the network 145.

In certain embodiments, the application may reside completely or partially on client device 105, which can be a mobile device 110, computing system 120, a personal digital assistant (PDA) 115, tablet computer, or any other device that includes a processor, memory, and an operating system. In addition, the application can completely or partially reside on any one of the other elements in system 100 of FIG. 1. For example, the application may reside in remote system 125, database 130, system 135, database 140, or somewhere on network 140 or the cloud.

If the application resides on client device 105, the application may be downloaded through a platform, such as an application store or market, residing on client device 105. In some embodiments, the platform may be accessed via client device 105 or accessed through the device's browser communicably coupled to the network 145. In other embodiments, the application may be pre-loaded on the device.

The application may be compatible with any client device 105 such as a personal computer with a touch screen, a laptop with a touch screen, a personal computing tablet, a smartphone, a PDA or any device with a processor, memory and a touch screen.

Figure 1B:
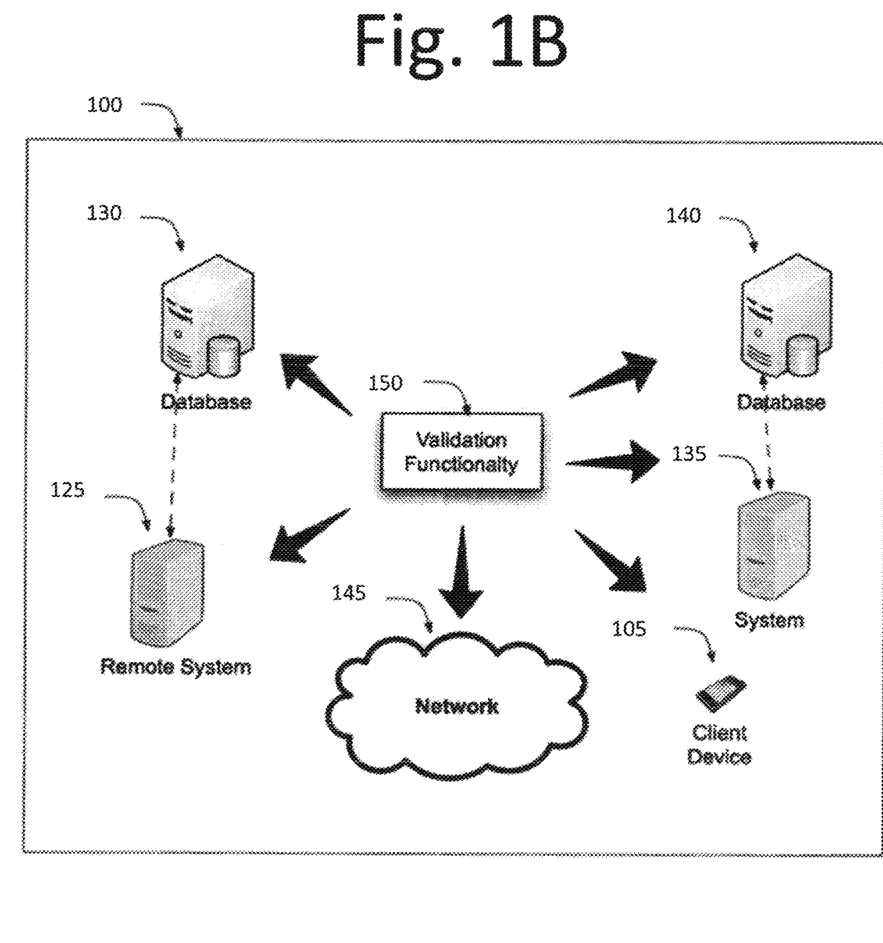
FIG. 1B illustrates a validation functionality of message guardian system, according to an embodiment of the present invention.

FIG. 1B illustrates a validation functionality of message guardian system 100, according to an embodiment of the present invention. In this embodiment, validation functionality 150 may reside in on system 135 and/or database 140, which may be communicably coupled to the system 135. In other embodiments, validation functionality may reside on remote system 125 and/or database 130, which may be communicably coupled to the remote system 25. In a further embodiment, the validation functionality 150 may reside on client device 105, the cloud, and/or the network 145.

Figure 2:
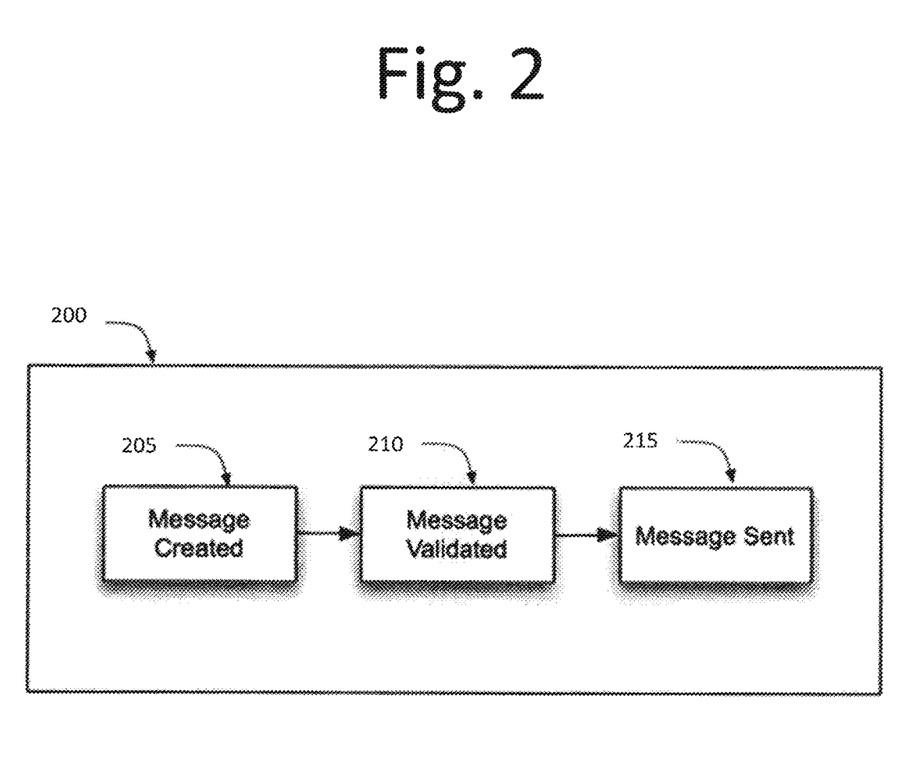
FIG. 2 is a flow diagram illustrating a process for validating a message, according to an embodiment of the present invention.

FIG. 2 is a flow diagram 200 illustrating a process for validating a message, according to an embodiment of the present invention. In this embodiment, the process begins with the user creating a message 205 on the client device. The message may be an email, text message, chat message, voice message, voicemail message, or a multimedia message including images, videos, documents, and the like.

The message may then be validated at 210 by the validation functionality as further described herein. Finally, the user obtains a result from the message validation, and if validated, the message is then sent from the client device at 215.

Message Application

Figure 3:
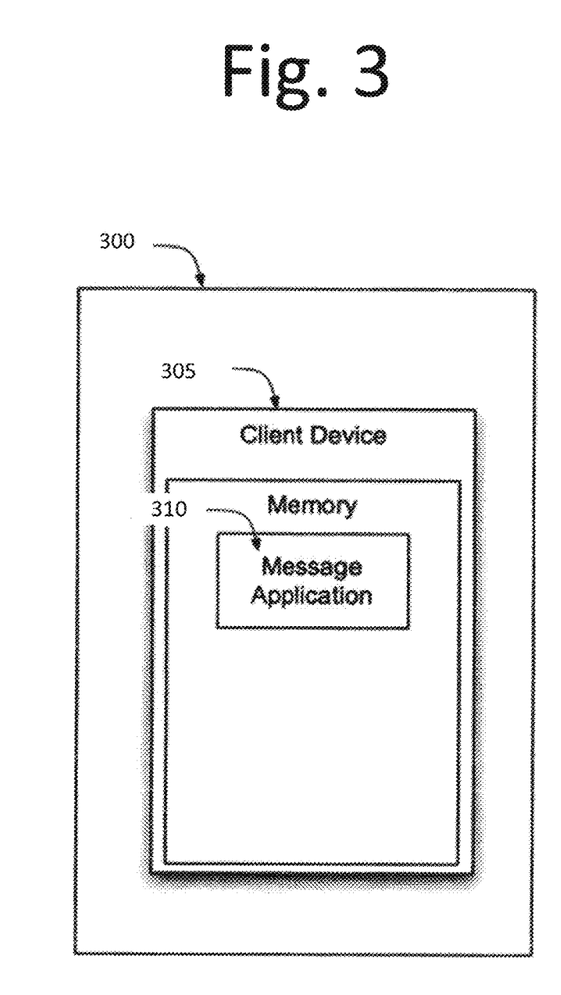
FIG. 3 illustrates a messaging application, according to an embodiment of the present invention.

FIG. 3 illustrates a messaging application 300, according to an embodiment of the present invention. In some embodiments, messaging application 300 may be any application that allows a user to originate messages on a client device 305. The messages may be an email, text message, chat message, voice message, voicemail message, or a multimedia message including images, videos, documents, and the like.

In this embodiment, message application 300 may be stored in memory 310 of a client device 305. Messaging application 300 may be utilized by a user of client device 305 to communicate with others via messaging. In some embodiments, the user may create a message, e.g., an email message, by executing messaging application 300 on client device 305 through a graphical user interface (GUI) of client device 305. The user may enter the recipient of the message and the body of the message.

The validation functionality may be interwoven into the message application 300 allowing the message to be validated after the user completes the entire message. The validation may occur before the message is sent in some embodiments. In other embodiments, the validation may occur as the user types each part of the message, e.g., validation occurs as the user types the subject, the body, and/or the attachments.

A notification overlaid on top of the message composition window may be sent to the user alerting the user to the potentially offensive (or invalid) elements of the message. These notifications may include specific data that aid the user in determining which part of the message failed validation, e.g., the subject, the body, and/or attachment. A coding functionality may be implemented to provide the rationale as to why the data failed validation, and the exact data, i.e., the word, phrase, and/or object that failed validation.

Message Validation Initiation

The messaging application 300 may allow validation of the created message. The validation may be executed on all parts of the message, i.e., the subject of the message, the body of the message, etc. The validation of the text in the message currently being created may occur at different intervals. For example, the message may be validated when the space bar is entered validating each word, as the words are input by the user. In another example, the message may be validated upon the user navigating away from the individual text entry components. In this example, when the focus of the GUI changes from text input component A to text input component B, the data entered into text input component A is then validated.

The message may also be validated when the user has completed the entire message. For example, when the focus of the GUI changes to the component to send the message, such as a "Submit" button component on the GUI of the message application 112, the validation functionality is initiated to validate the data of the composed message.

The message in some embodiments may be validated when the user interacts with a specific validation component on the GUI. For example, validation may occur when the user selects a "Validate" button.

Figure 4:
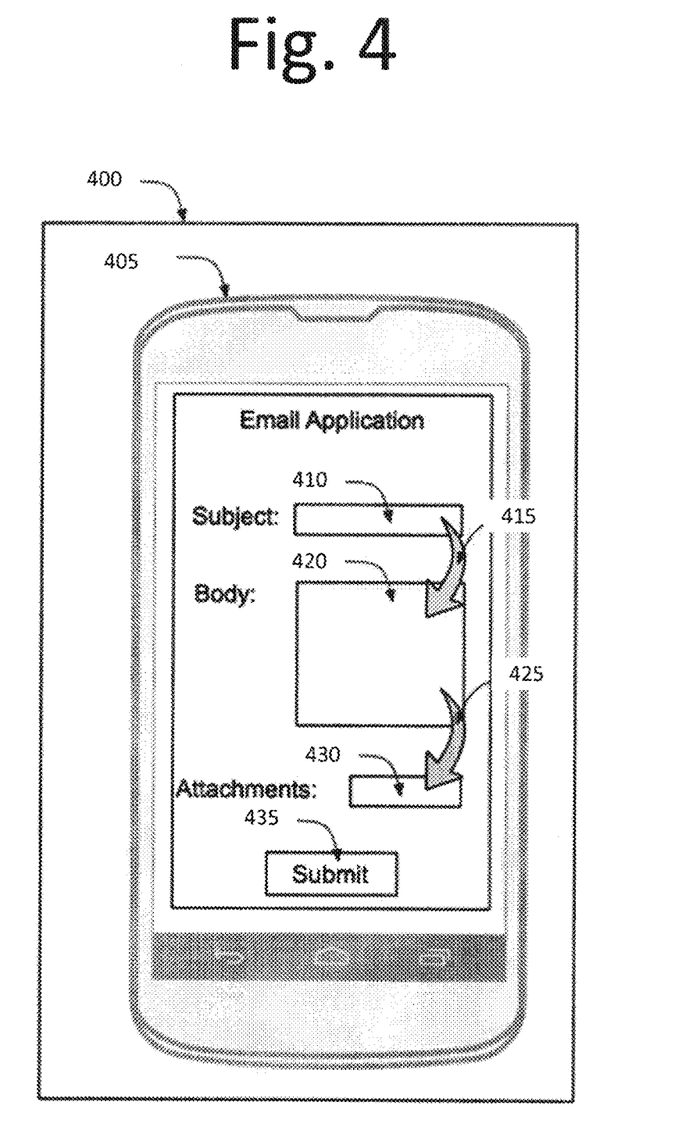
FIG. 4 illustrates an email message application for validation, according to an embodiment of the present invention.

FIG. 4 illustrates an email message application 400 for validation, according to an embodiment of the present invention. In this embodiment, an email messaging application 400 may include a validation functionality that performs validation for each text entry component as the user navigates from one field to the next. The user may enter the subject of a message in the subject text entry component 410, the body in the body text entry component 420, and attachment component 430. Also, other components may include the "to:" field, "cc" field, or any other fields that may not be depicted.

As the user navigates from the subject component 410 to the body component 420 as indicated by arrow 415, the validation functionality is initiated and validates the subject data. A validation message may be sent from client device 405 including the inputted data. In another embodiment, validation functionality may also occur after the user navigates from body component 420 to attachments component 430, as shown by arrow 425. In a further embodiment, validation may occur after receiving all of the inputted data, i.e., after the user selects the submit button 435 on client device 405.

In some embodiments, validation may occur as the user navigates or loses focus on a text entry component regardless of where the user navigates next. In GUI component navigation, the component that has the focus is the component that is currently active. A component may obtain focus when the user clicks on the component with, for example, a pointing device. As a component loses focus, the GUI functionality may throw an event that can be caught, e.g., validation functionality is performed when the focus of a particular component is lost.

A validation message may be sent to validation functionality. If the validation functionality exists on a separate server and not on client device, then messaging occurs between the validation functionality and the client device through a network.

In another embodiment, a validate component, such as a validate button, may be added to the messaging application allowing validation to be performed. In such an embodiment, the user may compose the entire message, press the "Validate" button to allow the validation of part of or the entire message before sending the message to the recipient(s).

In separate embodiment, a validation functionality may be added to the send component. In this embodiment, before the message is sent, the message is sent to/from the validation functionality prior to the sending of the message to another user. A notification may be received to identify any data that may have failed validation, or a notification may be received to indicate that all date has been validated. Once the notification is dismissed, the message may then sent to the recipient(s).

In another embodiment, in the scenario where all data in the composed message is validated, no notification is sent to the user and the message is sent to the recipient(s).

Composing Message that are Validated

Figure 5:
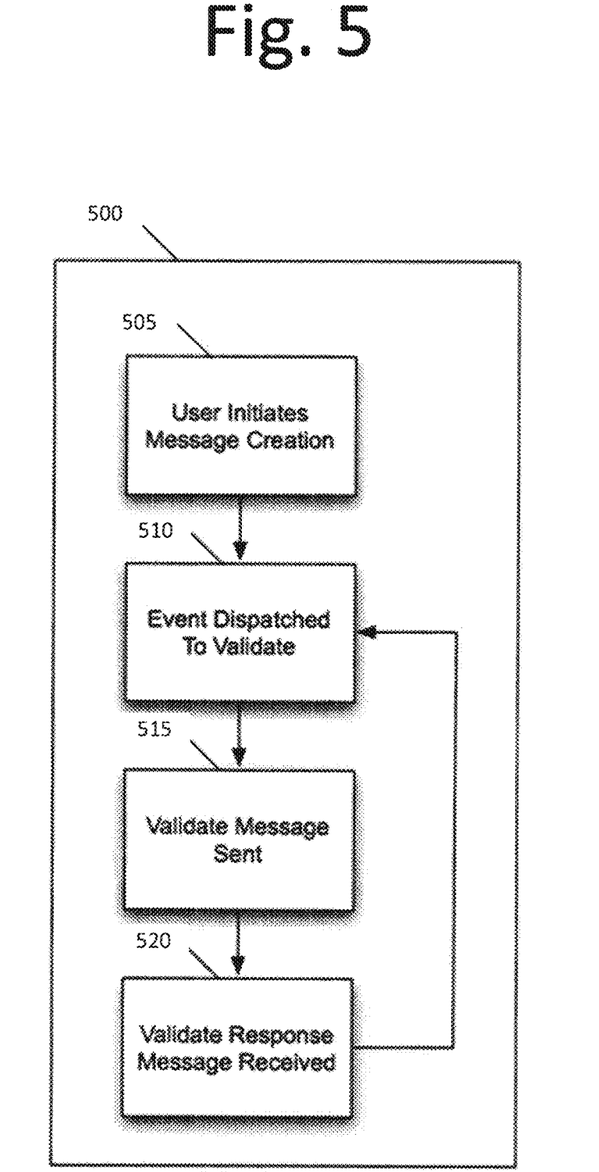
FIG. 5 is a flowchart illustrating for a process of creating a message, according to an embodiment of the present invention.

FIG. 5 is a flowchart 500 illustrating for a process of creating a message, according to an embodiment of the present invention. In this embodiment, the process begins at 505 with the user initiating the messaging application to compose a message. This message may be any of the messages supported by the message application.

In some embodiments, the validation functionality is embedded into a GUI code to trigger the sending of a validate message at particular points in the navigation of the GUI. For example, an event may be dispatched at 510 that is caught by a process that sends a validate message.

At 515, the validate message is sent to the validation functionality to allow the process of validating the data in the validate message to begin. At 520, a validate response message may be received. The validate response message may include result (s) of the validation of the data included in the validate message from step 515. The user may be notified of any data in the message (through, for example a notification alert on his or her client device) that has been determined to be invalid.

The process may continue until the entire message has been validated.

Figure 6:
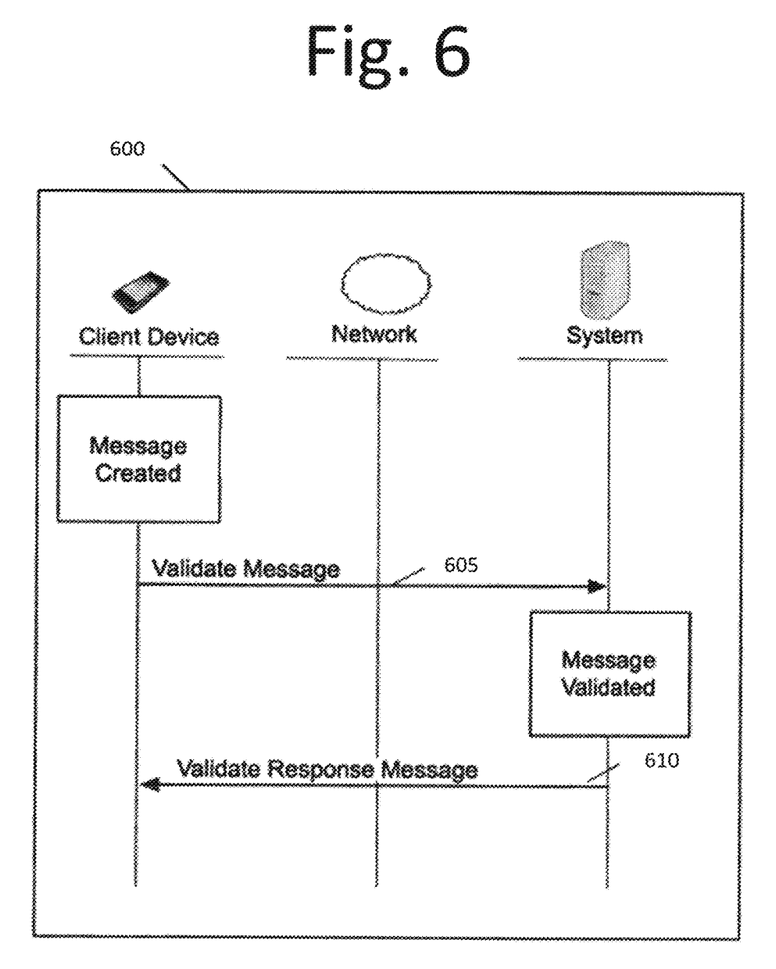
FIG. 6 is a flow diagram illustrates a flow of validating data, according to an embodiment of the present invention.

FIG. 6 is a flow diagram 600 illustrates a flow of validating data, according to an embodiment of the present invention. In this embodiment, a user may create a message on his or her client device. The validation of the message is triggered when a validate message including the created message is sent at 605 to a system over the network. The system may include the validation functionality allowing validation of the created message to be performed. After the validation functionality performs validation of the created message, the validate response message is sent back to the client device at 610.

The format and specific elements of the validate message and the validate response message are described in further detail below. Also included are the functional details of the validation process and the criteria of determining whether data in the validation message could be considered invalid.

In some embodiments, the validate message may include any data in the message that is to be validated. Depending on when the message is triggered by the GUI, the message can include the entire message, or the message contents inputted by the user thus far. Below is an example of a validate message:

TABLE 1

Validate Message Contents
Validate Message

| Message Section | Message Contents |
| --- | --- |
| Subject | Contents of the subject part of the message (if applicable) |
| Body | Contents of the body part of the message |
| Attachments | Either a link reference to the attachments or the actual attachment(s) file |

In this embodiments, Table 1 is a mapping of the elements in the validate message. The column for the message section reflects the part of the message to validate. The column for the message contents reflects the data that is inputted into the message.

Included in the validate message may be parts of any type of message that a user of a client device may compose. Other types of data may be included by a person of ordinary skill in the art without deviating from the scope of the embodiments.

The data in the validate message may be parsed. More specifically, and in the above example, the message contents element in the each row of the validate message may be parsed. When parsing the text, the message may be cleaned up by forcing each character to lowercase and by trimming the whitespace off the beginning and the end of the string.

$message=strtolower($message);
$message=trim($message);

The function (strtolower) may convert the entire string (or message) to lower case. The function (trim) may remove the whitespace at the beginning and end of the string. At this point, regular expressions (regex) can be utilized to convert the elements of the message into words. These words can be stored and compared against other words. In some embodiments, parsing text is the process of traversing through the text, splitting up the words separated by white space and storing the words into a programming structure, e.g., an array of characters.

In one embodiment, once the data in the incoming validate message is split into an array of characters including the words in the data, the validate functionality may traverse through the words to compare against a list of words, phrases, and objects that are considered invalid. In another embodiment, a semantics engine is utilized to help determine context and meaning in the data of the incoming validate message, as described further below.

In yet another embodiment, objects (images, videos, documents and the like) may be received from the incoming validate message, and may be examined by the validation functionality. The use of optical character recognition (OCR) is utilized in some embodiments to determine content that is present in the object(s). OCR is the mechanical or electronic conversion of images of typewritten or printed text into machine-encoded text.

The validate functionality may compare parsed data with a list of words, phrases and/or objects considered inappropriate. In another embodiment, the inappropriate list can be edited. For example, words, phrases, and/or objects can be added, removed, altered allowing, for example, an organization to tailor the inappropriate list to their specific needs.

In one embodiment, a semantic engine is utilized to assist in understanding the intent and contextual meaning of the message data. This semantic engine allows the validation software (or module) to understand the context of the data in the validation message, and ascertain the meaning behind the data without depending on the strict interpretation of the data as presented. The semantic engine may be present in the validation functionality.

For example, Nuxeo™ is an open source HTTP server that can be used locally as well as hosted in the cloud. The semantic engine may be able to categorize documents according to the language, suggest meaningful tags from a controlled taxonomy, and assert the relative importance with respect to the text content of the document. The semantic engine may also find related documents in the local database or on the web, detect yet unknown entities of the same aforementioned types to enrich the knowledge base, and extract knowledge assertions that are present in the text to fill up a knowledge base along with a reference to trace the origin of the assertion.

These lists may then be used to compare the data in the validation message and potentially match words, phrases, and object that may be considered objectionable, offensive, not politically correct, etc. The comparison may occur in the validation functionality. For instance, the parsed words, phrases, and/or objects in the incoming validation message are compared against the list of inappropriate words, phrases, and objects.

Figure 7:
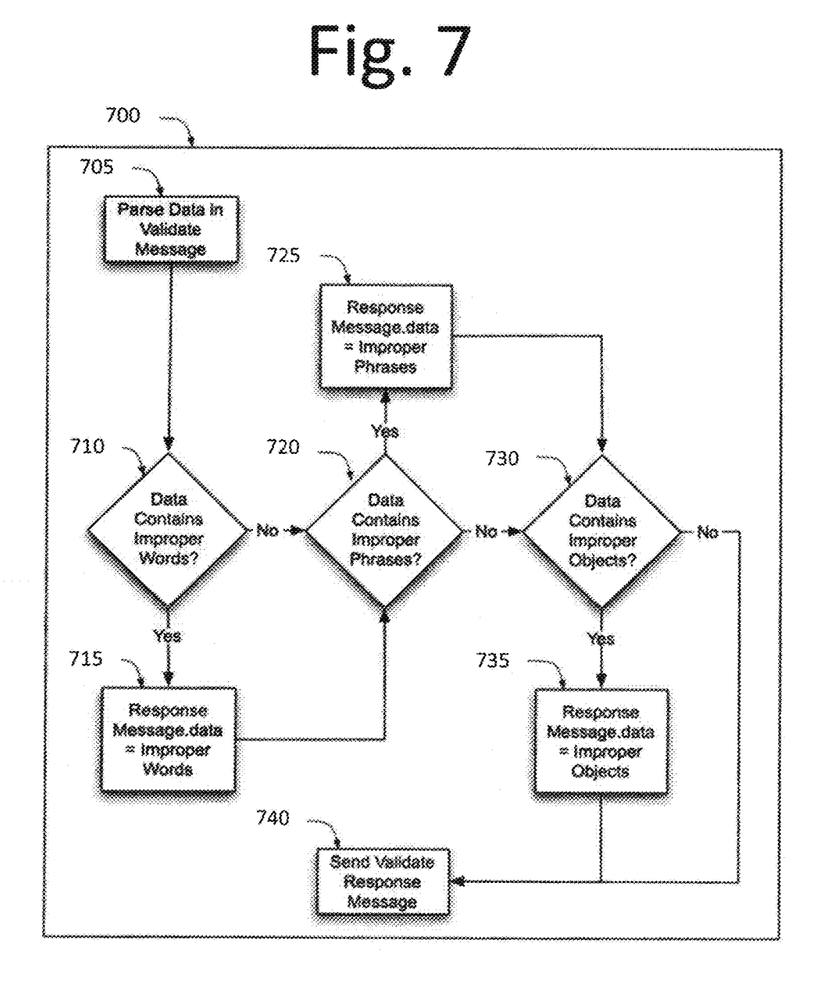
FIG. 7 is a flow diagram illustrating a process for validating a message, according to an embodiment of the present invention.

FIG. 7 is a flow diagram 700 illustrating a process for validating a message, according to an embodiment of the present invention. In this embodiment, the process begins with receiving the data included in the incoming validate message and parsing the data into words separated by spaces at 705. The words, phrases, and objects may be categorized such that an object is an attachment to the message being composed.

A check is made if the data includes one or more improper words at 710. If the data does not include one or more improper words, then the process continues to step 720. If, however, the data includes one or more improper words, then the one or more improper words are stored in the validation response message data at 715.

At 720, a check is made to determine whether the data includes one or more improper phrases. If the data does not include one or more improper phrases, then the process continues to step 730. If, however, the data includes one or more improper phrases, the improper phrases are then stored in the validation response message data at 725.

A check is also made to determine whether the data includes one or more improper objects at 735. If the data does not include one or more improper objects, the process continues to step 740. If, however, the data includes one or more improper objects, then the improper objects or references to the improper objects or the improper objects, filename are then stored in the validation response message at 740. The validation response message may then be sent to the client device.

Figure 8:
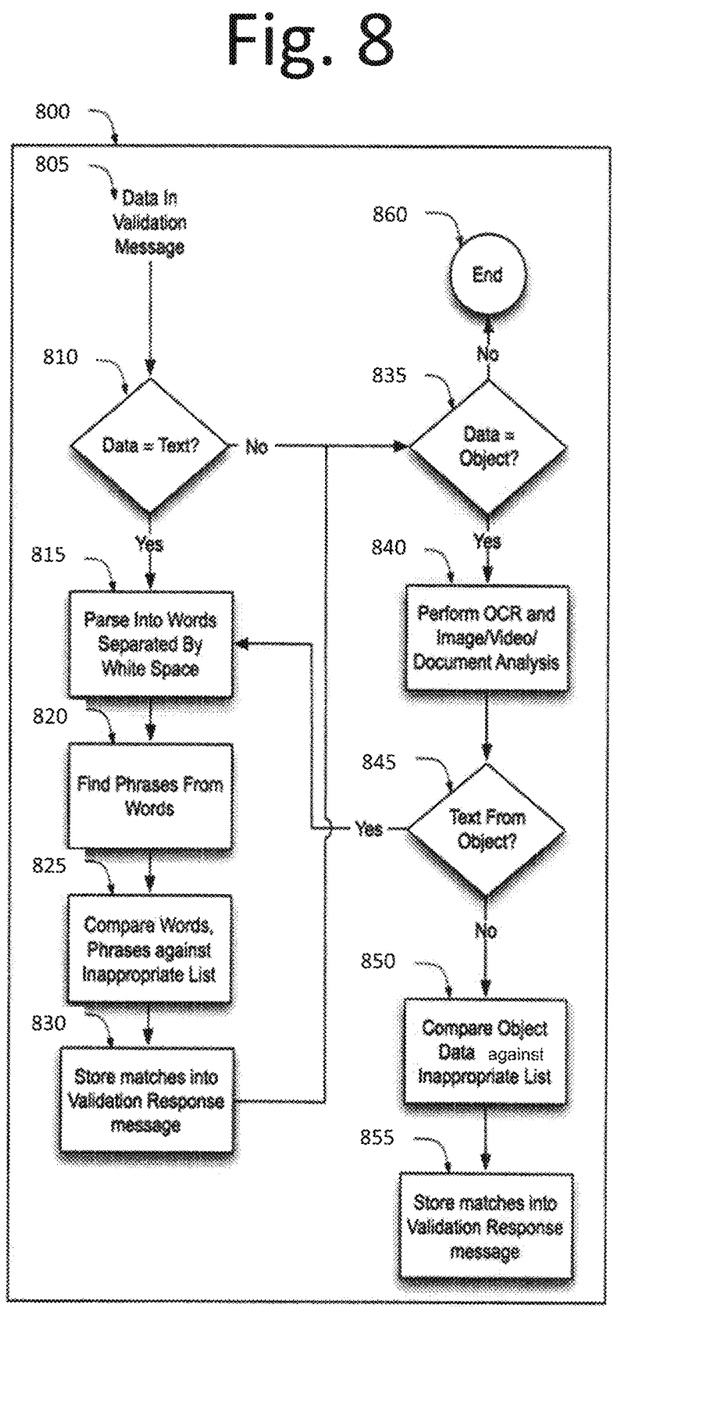
FIG. 8 is a flow diagram illustrating a process for validating a second message, according to an embodiment of the present invention.

FIG. 8 is a flow diagram 800 illustrating a process for validating a second message, according to an embodiment of the present invention. In this embodiment, the process begins at 805 with data included in validation message being received. At 810, a check is performed to determine whether the data includes text. If the data includes text, then the text is parsed into words separated by white space at 815. The phrases from the parsed words are found at 820, and at 825, the words and/or phrases are compared in some embodiments against a list of phrases and/or words. In other embodiments, the words may be combined to form the phrases. Also, matching phrases may be found in some embodiments by comparing the individual parsed words with the list of phrases for a match.

In other words, at 825, a comparison is made between the words and/or phrases derived from the parsed words and/or phrases included in the received validation message. If matches are encountered, i.e., if words and/or phrases within the validation message are found to be inappropriate, then at 830 the matched words and/or phrases are added to a validation response message and the appropriate data is set in the validate response message.

At 805, if the data in the validation message did not include text, or the processing of the text in the validation message is complete at 830, then at 835 the data is checked to determine whether objects are present. If there were no objects found in the data, then the process ends at 860. If one or more objects are found, then the objects are analyzed, via OCR and/or another analysis functionality, at 840. If text is obtained from the analysis of the object(s), the process returns to step 815 allowing the text to be parsed and processed as discussed above. If text from the object is not found, then the object(s) are compared against the list of inappropriate objects at 850. If matches are encountered, then the matched objects and/or references to the matched objects are added to the validation response message and the appropriate data is set in the validate response message at 855.

In certain embodiment, letters, characters (e.g., exclamation points, question marks, emojis, etc.) are defined and compared in addition to the parsing of the words in the validation functionality. These letters and characters may be compared against the list of inappropriate data in the validation functionality.

Validate Response Message

The validate response message may include data to indicate whether the validation was successful. See Table 2 below.

TABLE 2

Validate Response Message Contents
Validate Response Message

| Message Section | Message Contents |
| --- | --- |
| Message Section | The part of the message pertaining to the invalid code. |
| Invalid Code | A code indicating the result of the validation functionality |
| Contents | The exact text/object that failed validation |

In some embodiments, Table 2 shows a mapping of the elements in the validate response message. A message section element may identify parts of the message (i.e., subject, body, etc.) that the portion of the response data pertains to.

An invalid code element may be used in some embodiments to correlate a code of the result of the validation. The code can be a numerical representation, an enumerated representation, or a similar code. For example, the following code mapping may help the user to understand the result of the message validation:

TABLE 3

Result of Code Contents
Result Codes

| | |
| --- | --- |
| 1 | Racist |
| 2 | Damaging/Confidential To Organization |

TABLE 3-continued

Result of Code Contents
Result Codes

| | |
| --- | --- |
| 3 | Confidential - External (should not be shared outside the organization) |
| 4 | Damaging To Character |
| 5 | Language |

Table 3 shows a mapping of the code values that may be used in the validate response message. In this example, the table depicts only a sample of the possible codes that can be implemented and a person of ordinary skill in the art would readily appreciate other more granular code values may be used.

Finally, the contents of the data that failed validation may be included in the validation response message. This may be a word (in the case that a word failed validation), a phrase (in the case that a phrase failed validation), and/or an object (in the case that an object failed validation).

This format of the validation response message may allow a notification to the user to obtain the exact reference to the data that failed validation, and allow the user to easily understand which part of the composed message is potentially invalid or harmful. In another embodiment, more than one code may be present in the validation response message.

For example, if the user enters the following text in a message composition: "I can't believe that incompetent testers are going to hold up the release.", the validation of the message matches the word "incompetent" and builds a validation response message to include the following notification:

| | |
| --- | --- |
| Message Section | Body |
| Code | 3 |
| Contents | Incompetent |

The message section of "Body" indicates that the body of the message failed validation. The code value of 3 in this example indicates that the invalidation was due to a word/phrase/object that could be considered damaging to the user's character, and the contents include the word "incompetent".

Figure 9:
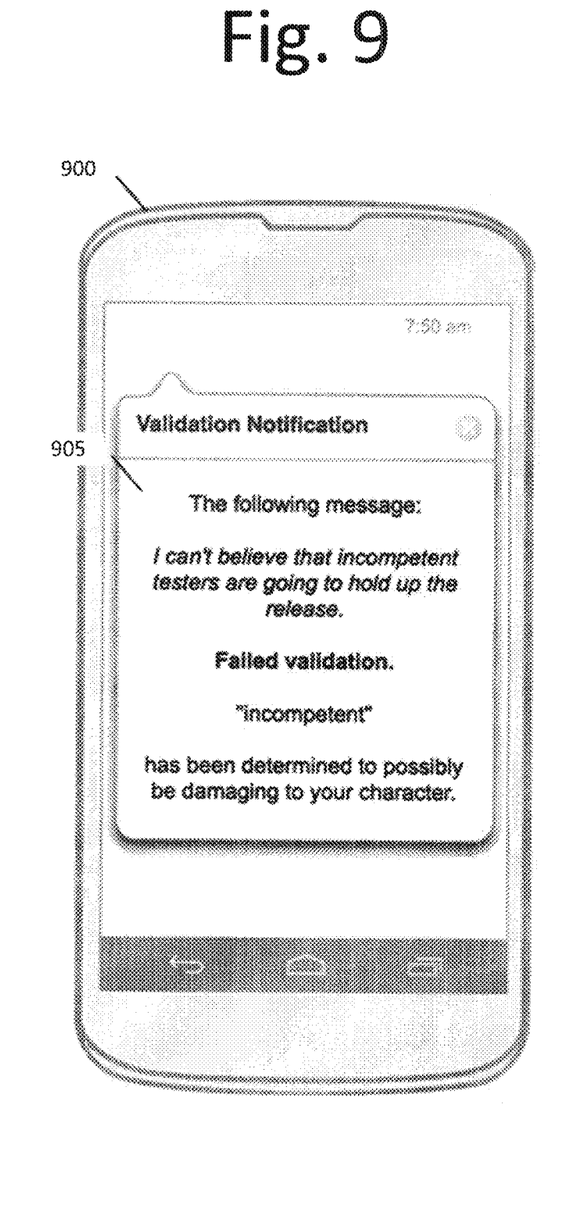
FIG. 9 illustrates a client device displaying a validation notification, according to an embodiment of the present invention.

FIG. 9 illustrates a client device 900 displaying a validation notification 905, according to an embodiment of the present invention. In this embodiment, a notification 905 may be displayed on any type of client device. Notification 905 relays the invalidation to the user. The user can dismiss the notification by interacting with the notification. For example, pressing an "X" button on the top/right of notification 905, and as a result, the previous window may be redisplayed in on client device 900. This may allow the user can alter the message, as it has not been sent.

In another example, the user may enter the following text in a message: "Our competitor, XYZ, is heading to market in April. We need to find a way to stop their market traction at Gitex." In this example, the validation matches the phrase "stop their market traction" in the message, and returns a validation response message with a code=2 indicating that the phrase can be damaging to the organization.

In another embodiment, the validation software matches objects that are included in the message being composed. These objects may be attached to the message. The validation functionality that is utilized may match the object with possibly invalid objects in some embodiments.

A list of potentially offensive or otherwise invalid objects (i.e., images, videos, documents, and/or other multimedia files) is stored in the system that performs the validation. This list may be actual filenames of potentially offensive objects and/or a list of websites that contain potentially offensive objects.

In some embodiments, when an attachment object is sent in the validation message, data related to the object is included in the message. For example, the name of the object, the location referencing the object if the object is a link to a stored file on the network, and other similar data. The validating process may then compare the object data, and attempt to match the object with the list of potentially offensive objects. Simply stated, the validating process determines whether the filename of the object matches the filename of a potentially offensive object, or whether the source of the object matches the location of offensive object (for example sites on the Internet).

In other embodiments, the offensive word/phrase/object may be replaced with an alternative word/phrase/object considered to be less offensive. The validation response message in these embodiments may include alternative data, which is included in the notification sent to the user (not shown).

The validation functionality in some embodiments may include a list of alternative words/phrase/objects in addition to the list of offensive words/phrases/objects. This alternative list may be used when matching the parsed data from the validation message. For example, the user may include the following "The Alpha product is going to smash the tech market next year." in a message on the client device, and functionality may send the text in the message for validation.

Validation functionality may then parse the message and search for phrases from the parsed words. For example, the phrase "Alpha Product" is matched with the list of phrases. When compared against the list of inappropriate words that is stored in the validation functionality, the phrase may be matched. In addition, ab alternative phrase "future product" may be included in the stored list.

The data is then added to the validation response message including a code value of 3: Confidential—External (should not be shared outside the organization), and is then sent back to the client device. A notification is presented to the user with a text. See, for example, FIG. 10, which shows a validation notification 1000 with recommended text, according to an embodiment of the present invention.

Figure 10:
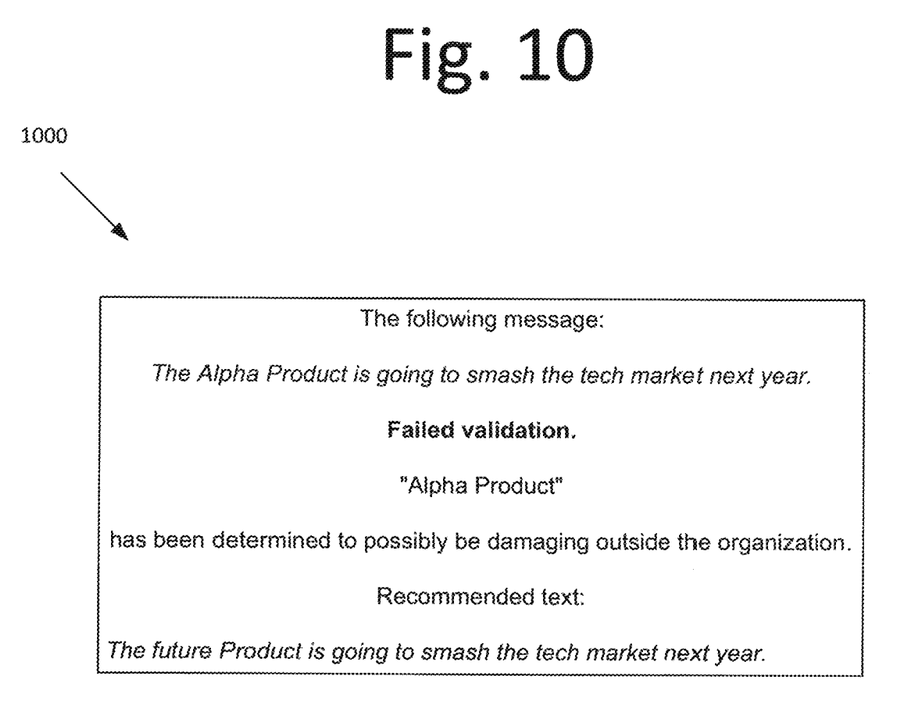
FIG. 10 illustrates a validation notification with recommended text, according to an embodiment of the present invention.

In certain embodiments, there exists a component on the notification (i.e., a "Replace" button) that alters the text in the message to the recommended text. There also may also exist a component on the notification (i.e., a "Decline" button) that dismisses the notification when changes are not to be made to the message.

Communication Method

In an alternate embodiment, there may be a functionality to directly connect the user with the recipient(s) of the message in the notification of data that has been invalid. This functionality allows the user to place a voice call with the recipient(s) to allow the user to create a trail of data that may include potentially invalid data. In such an embodiment, the notification component may include a button entitled "Call Direct" that, when pressed, places a call to the recipient(s) of the message. The number(s) of the recipient(s) may be obtained from the data on the user's client device, e.g., the user's contact data.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A process, comprising:
receiving, by a system, a message composed by a user of a client device;
determining, by the system, whether the composed message comprises inappropriate terms, phrases, objects, or a combination thereof, wherein the determining occurs as the user types the message;
when the message comprises inappropriate terms, phrases, objects, or a combination thereof, assigning a code to the message, by the system, wherein the code identifies a respective reason that the message failed validation; and
transmitting, by the system, a notification back to the user composing the message when the composed message comprises inappropriate terms, phrases, or objects, the notification comprising a section of the message where the validation failed, the code, and a reason for failure associated with the code.

2. The process of claim 1, wherein the determining of whether the composed message comprises inappropriate terms, phrases, objects, or a combination thereof, comprises:
   parsing the data in the composed message to determine whether the composed message comprises inappropriate terms, phrases, objects, or a combination thereof.

3. The process of claim 2, wherein the determining whether the composed message comprises inappropriate terms, phrases, objects, or a combination thereof further comprises:
   determining whether the data matches one or more inappropriate terms.

4. The process of claim 2, wherein the determining whether the composed message comprises inappropriate terms, phrases, objects, or a combination thereof further comprises:
   determining whether the data matches one or more inappropriate phrases.

5. The process of claim 2, wherein the determining whether the composed message comprises inappropriate terms, phrases, objects, or a combination thereof further comprises:
   determining whether the data matches one or more inappropriate objects.

6. The process of claim 1, wherein the notification comprises data matching the inappropriate terms, phrases, objects, or a combination thereof.

7. The process of claim 1, wherein the notification further comprises suggested terms, phrases, objects, or a combination thereof to replace data matching the inappropriate terms, phrases, objects, or a combination thereof.

8. An apparatus, comprising:
   a processor; and
   memory comprising a set of instructions, wherein the set of instructions, with the processor, is configured to cause the apparatus to:
   receive, from a client device, a validation message comprising a message composed by a user of the client device,
   determine whether the composed message comprises data that matches with one or more inappropriate terms, phrases, objects, or a combination thereof, wherein the determining occurs as the user types the message,
   when the message comprises inappropriate terms, phrases, objects, or a combination thereof, assign a code to the message, wherein the code identifies a respective reason that the message failed validation, and
   send a notification back to the client device of the user composing the message when the composed message comprises data that matches with one or more inappropriate terms, phrases, or objects, the notification comprising a section of the message where the validation failed, the code, and a reason for failure associated with the code.

9. The apparatus of claim 8, wherein the set of instructions, with the processor, is further configured to cause the apparatus to parse the data in the composed message to determine whether the composed message comprises inappropriate terms, phrases, objects, or a combination thereof.

10. The apparatus of claim 9, wherein the set of instructions, with the processor, is further configured to cause the apparatus to determine whether the parsed data matches the one or more inappropriate terms.

11. The apparatus of claim 9, wherein the set of instructions, with the processor, is further configured to cause the apparatus to determine whether the parsed data matches the one or more inappropriate phrases.

12. The apparatus of claim 9, wherein the set of instructions, with the processor, is further configured to cause the apparatus to determine whether the parsed data matches one or more inappropriate objects.

13. The apparatus of claim 8, wherein the notification comprises the data matching the one or more inappropriate terms, phrases, objects, or a combination thereof.

14. The process of claim 8, wherein the notification further comprises suggested terms, phrases, objects, or a combination thereof to replace the data that matches the inappropriate terms, phrases, objects, or the combination thereof.

15. A computer program embodied on a non-transitory computer-readable medium, the computer program is configured to cause a processor to:
   receive, from a client device, a validation message comprising a message composed by a user of the client device;
   determine whether the composed message comprises data that matches with one or more inappropriate terms, phrases, objects, or a combination thereof, wherein the determining occurs as the user types the message;
   when the message comprises inappropriate terms, phrases, objects, or a combination thereof, assign a code to the message, wherein the code identifies a respective reason that the message failed validation; and
   send a notification back to the client device of the user composing the message when the composed message comprises data that matches with one or more inappropriate terms, phrases, objects, or a combination thereof, the notification comprising a section of the message where the validation failed, the code, and a reason for failure associated with the code.

16. The computer program of claim 15, wherein the computer program is further configured to cause the processor to parse the data in the composed message to determine whether the composed message comprises inappropriate terms, phrases, objects, or a combination thereof.

17. The computer program of claim 16, wherein the computer program is further configured to cause the processor to cause the apparatus to determine whether the parsed data matches the one or more inappropriate terms.

18. The computer program of claim 16, wherein the computer program is further configured to cause the processor to determine whether the parsed data matches the one or more inappropriate phrases.

19. The computer program of claim 16, wherein the computer program is further configured to cause the processor to determine whether the parsed data matches one or more inappropriate objects.

20. The computer program of claim 15, wherein the notification comprises the data matching the one or more inappropriate terms, phrases, objects, or a combination thereof.

21. The computer program of claim 15, wherein the notification further comprises suggested terms, phrases, objects, or a combination thereof, to replace the data that matches the inappropriate terms, phrases, objects, or the combination thereof.

* * * * *